United States Patent
Shiraga et al.

(10) Patent No.: US 7,535,219 B2
(45) Date of Patent: May 19, 2009

(54) ROTATION ANGLE DETECTOR

(75) Inventors: Shozoh Shiraga, Fukui (JP); Tamotsu Ohta, Fukui (JP); Hiromitsu Noda, Fukui (JP); Mayuko Okada, Fukui (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/060,372

(22) Filed: Apr. 1, 2008

(65) Prior Publication Data

US 2008/0238416 A1    Oct. 2, 2008

(30) Foreign Application Priority Data

Apr. 2, 2007    (JP) ............ 2007-096240

(51) Int. Cl.
  *G01B 7/30*    (2006.01)
(52) U.S. Cl. ............... 324/207.25; 73/514.39
(58) Field of Classification Search ......... 324/173–174, 324/207.25; 73/514.31, 514.39; 338/32 R, 338/32 H
  See application file for complete search history.

(56) References Cited

U.S. PATENT DOCUMENTS 6,870,470 B2    3/2005    Nomura et al.
7,116,200 B2 *    10/2006    Baarman et al. ....... 324/207.25
2006/0208176 A1    9/2006    Shimizu et al.

FOREIGN PATENT DOCUMENTS

JP    2006-258625    9/2006

* cited by examiner

*Primary Examiner*—Bot LeDynh
(74) *Attorney, Agent, or Firm*—Wenderoth, Lind & Ponack, L.L.P.

(57) ABSTRACT

A rotation angle detector includes a rotator, first and second detecting bodies, an auxiliary detecting body, first and second detectors, an auxiliary detector, and a controller. The first detecting body rotates in association with the rotator, and the first detector detects rotation of the first detecting body. The second detecting body rotates in association with the first detecting body at a different speed therefrom, and the second detector detects rotation of the second detecting body. The auxiliary detecting body is engaged with the rotator at a position symmetrical to the first detecting body with respect to a rotation axis of the rotator. The auxiliary detector detects rotation of the auxiliary detecting body. The controller detects a rotation angle of the rotator based on detection signals from the first, second, and auxiliary detectors.

17 Claims, 6 Drawing Sheets

ROTATION ANGLE DETECTOR

BACKGROUND OF THE INVENTION

1. Field of the Invention

The present invention relates to a rotation angle detector mainly used for detecting a rotation angle of a steering wheel of an automobile.

2. Description of the Related Art

In recent years, more and more automobiles have been equipped with increasingly sophisticated equipment such as various kinds of rotation angle detectors, which detect a rotation angle of a steering wheel, for use with various controls. One of such conventional rotation angle detectors is described as follows with reference to FIGS. 5, 6A, and 6B.

Figure 5:
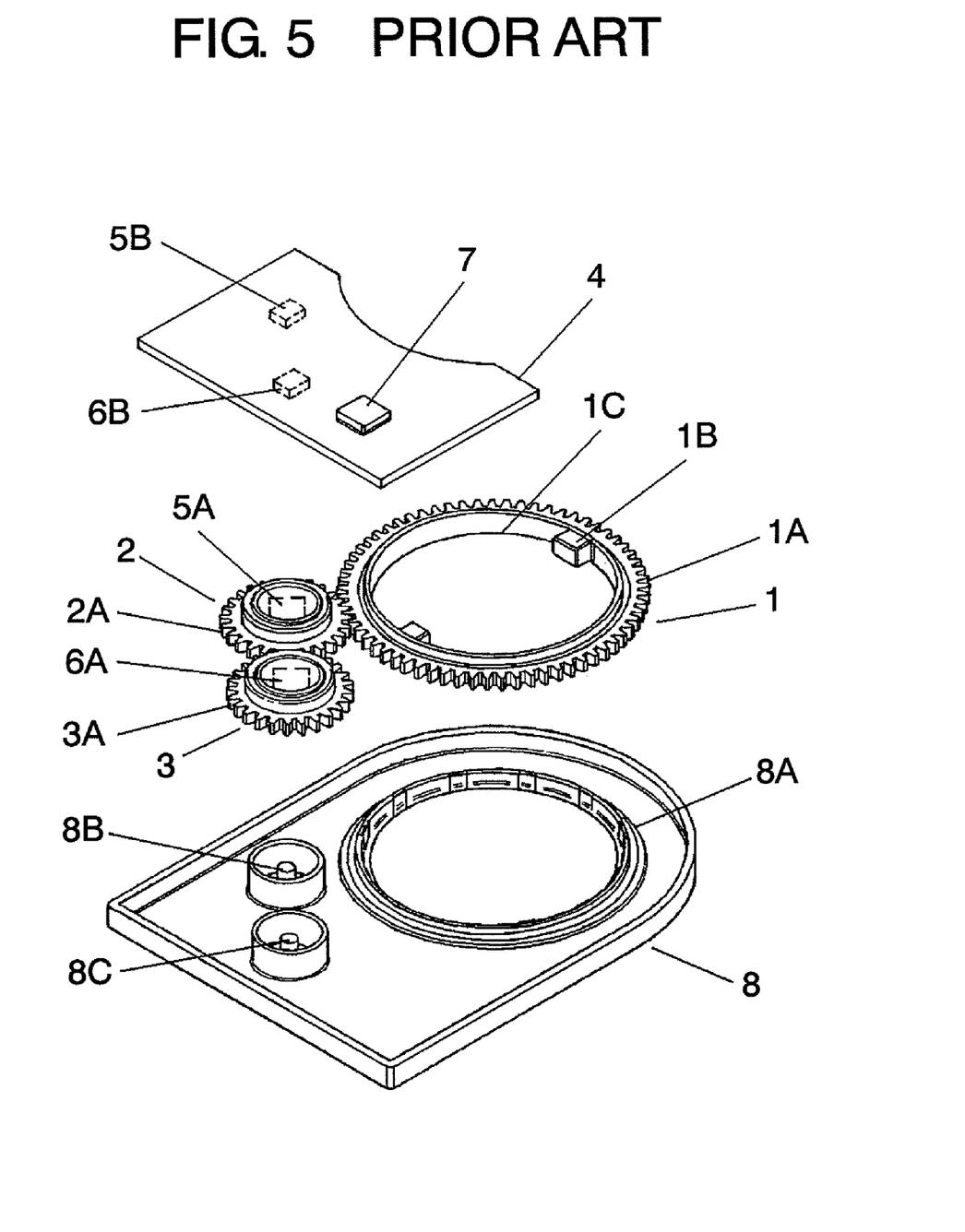
FIG. 5 is an exploded perspective view of a conventional rotation angle detector.

FIG. 5 is an exploded perspective view of the conventional rotation angle detector. Rotator 1 has spur gear 1A on the outer periphery of the side surface thereof. Rotator 1 is provided at its center with a hole for passing a shaft of a steering wheel (unillustrated) therethrough, and on its inner periphery with engaging portion 1B to be engaged with the shaft of the steering wheel. First detecting body 2 has spur gear 2A on the outer periphery of the side surface thereof. Second detecting body 3 has spur gear 3A on the outer periphery of the side surface thereof. Spur gear 2A has a different number of teeth than spur gear 3A, and is engaged with both spur gears 1A and 3A.

Wiring board 4 is placed above first and second detecting bodies 2 and 3, nearly parallel thereto. Wiring board 4 is provided on both sides thereof with a plurality of wiring patterns (unillustrated), and mounted with magnetic detection elements 5B and 6B. Magnetic detection element 5B is placed at a position facing magnet 5A at the center of first detecting body 2, and magnetic detection element 6B is placed at a position facing magnet 6A at the center of second detecting body 3. Magnet 5A and magnetic detection element 5B together form a first detector. Magnet 6A and magnetic detection element 6B together form a second detector. On wiring board 4, controller 7 is also mounted. Controller 7 is made of an electronic component such as a microcomputer, which is connected to magnetic detection elements 5B and 6B.

The rotation angle detector is housed in case 8, which is box-shaped and made of an insulating resin. Rotator 1 has cylindrical portion 1C on its bottom surface, and case 8 has cylindrical portion 8A whose inner periphery rotatably holds cylindrical portion 1C. Case 8 further has shafts 8B and 8C. Shaft 8B rotatably holds the center of first detecting body 2, and shaft 8C rotatably holds the center of second detecting body 3.

In the rotation angle detector thus structured, controller 7 is connected to an electronic circuit (unillustrated) in an automobile via, for example, a connector or a lead wire (unillustrated). The shaft of the steering wheel passing through the hole at the center of rotator 1 is engaged with engaging portion 1B, so that the rotation angle detector is attached to the automobile. Such a rotation angle detector is disclosed in Japanese Patent Unexamined Publication No. 2006-258625, for example.

In the above-described conventional structure, when the steering wheel rotates, rotator 1 rotates and causes first detecting body 2 to rotate in association therewith. The rotation of first detecting body 2 causes second detecting body 3 to rotate in association therewith. Accordingly, magnets 5A and 6A attached at their centers also rotate. Magnetic detection elements 5B and 6B detect changes in the magnetism of magnets 5A and 6A, respectively, and output them as detection signals.

Since spur gears 2A and 3A have different numbers of teeth than each other, first and second detecting bodies 2 and 3 rotate at different speeds than each other. As a result, data waveforms from magnetic detection elements 5B and 6B have different cycle lengths than each other and, therefore, become detection signals different in phase.

Controller 7 performs a predetermined calculation based on the two different detection signals obtained from magnetic detection elements 5B and 6B and on the numbers of teeth of spur gears 2A and 3A, thereby detecting a rotation angle of rotator 1. This rotation angle corresponds to a rotation angle of the steering wheel. The result is output to the electronic circuit of the automobile so as to perform various functions for the automobile.

Figure 6A:
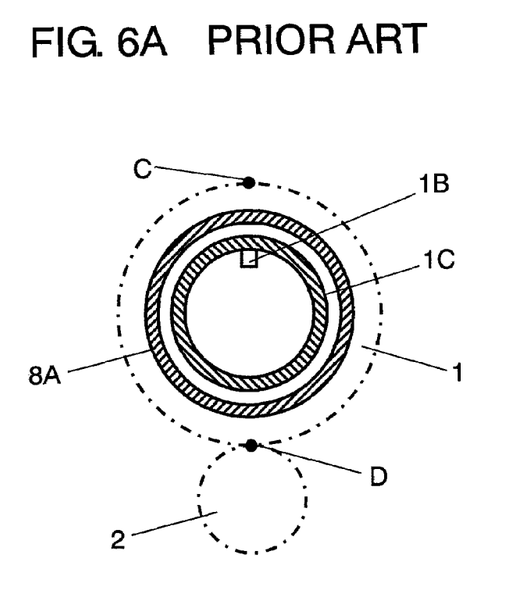
FIGS. 6A and 6B are schematic plan views of the rotation angle detector shown in FIG. 5.

In the rotation angle detector described above, as shown in the schematic plan view of FIG. 6A, there is a gap providing a certain clearance between the outer periphery of cylindrical portion 1C of rotator 1 and the inner periphery of cylindrical portion 8A of case 8 so that rotator 1 can rotate. The gap is only 0.1 mm or less.

Figure 6B:
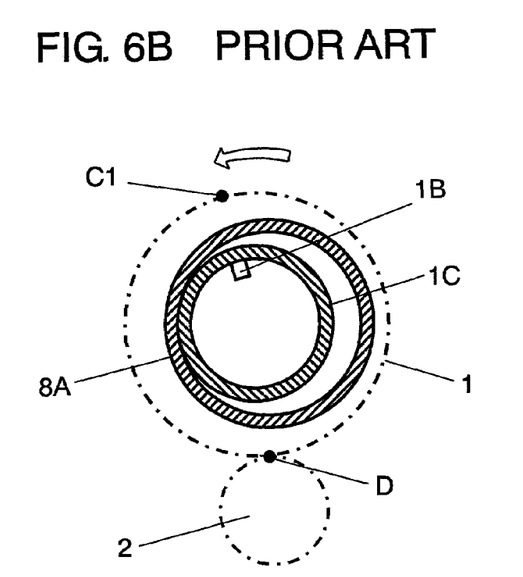

When the steering wheel starts to rotate leftward (i.e., counter-clockwise), for example, rotator 1 starts to rotate via the shaft of the steering wheel and engaging portion 1B engaged therewith, thereby moving leftward an amount corresponding to the gap, as shown in FIG. 6B. Consequently, the rotation of rotator 1 is transmitted to first detecting body 2 after the left-side of the outer periphery of cylindrical portion 1C comes into contact with the left-side of the inner periphery of cylindrical portion 8A.

More specifically, immediately after the steering wheel starts to rotate, rotator 1 rotates an amount corresponding to the angle from point C to point C1. However, point D, at which rotator 1 is engaged with first detecting body 2, does not change. In other words, first detecting body 2 starts to rotate when rotator 1 has rotated from point C to point C1. Therefore, after rotator 1 starts to rotate, first detecting body 2 starts to rotate after a time delay corresponding to the gap between cylindrical portions 1C and 8A, although the time delay is very small. As a result, the conventional rotation angle detector causes slight errors in detecting the rotation angle.

SUMMARY OF THE INVENTION

The present invention provides a rotation angle detector which can accurately detect a rotation angle with a simple structure. The rotation angle detector of the present invention includes a rotator; first, second and auxiliary detecting bodies; first, second and auxiliary detectors; and a controller. The first detecting body rotates in association with the rotator, and the first detector detects rotation of the first detecting body. The second detecting body rotates in association with the first detecting body at a different speed therefrom, and the second detector detects rotation of the second detecting body. The auxiliary detecting body is engaged with the rotator at a position symmetrical to the first detecting body with respect to a rotation axis of the rotator. The auxiliary detector detects rotation of the auxiliary detecting body. The controller detects a rotation angle of the rotator based on detection signals from the first, second, and auxiliary detectors.

In this structure, the auxiliary detecting body starts to rotate simultaneously and in association with the rotator before the first detecting body starts to rotate. This allows the controller to accurately detect a rotation angle with a simple structure immediately after the rotator starts to rotate, by detecting rotation of the auxiliary detecting body.

DETAILED DESCRIPTION OF THE INVENTION

Figure 1:
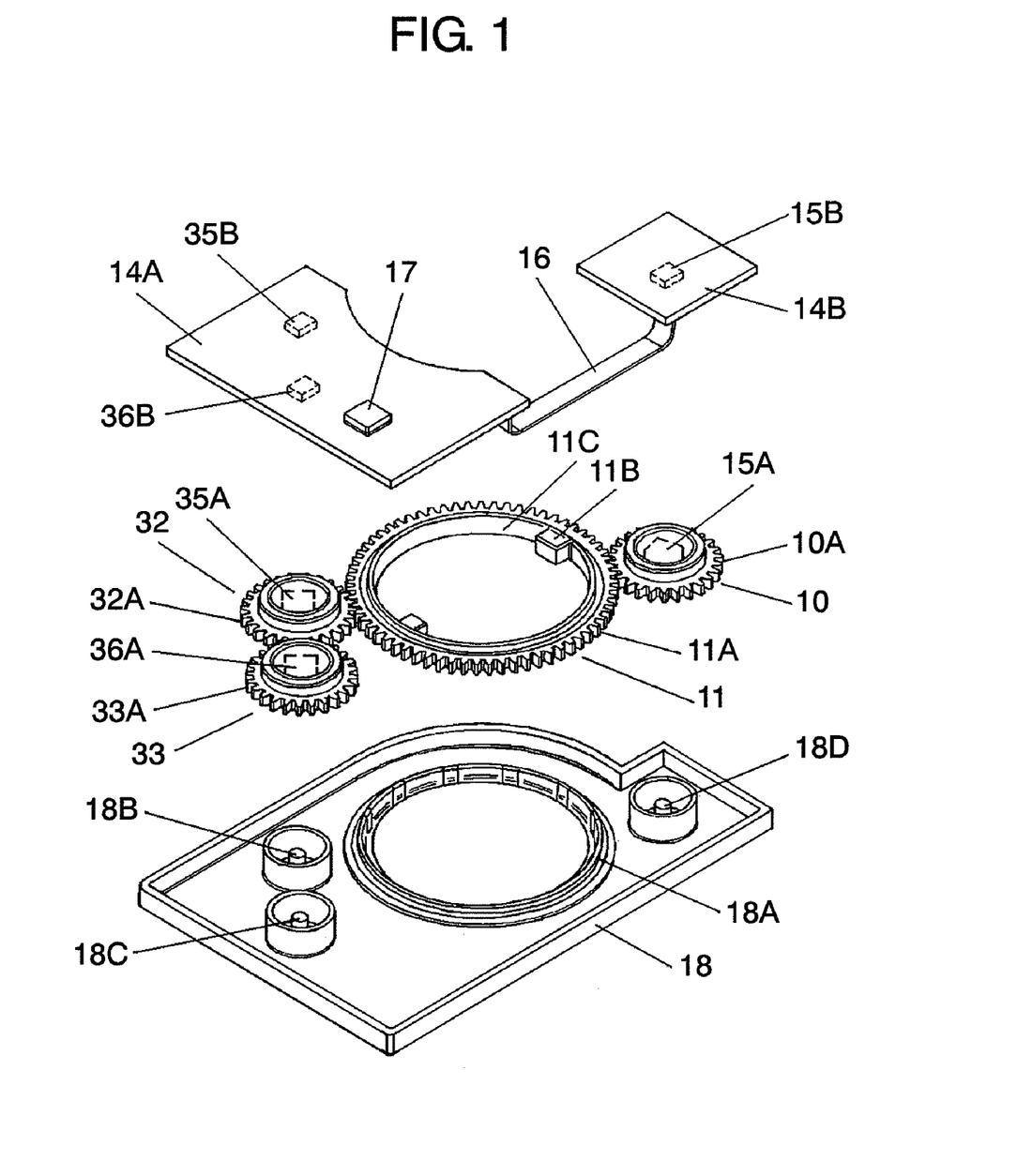
FIG. 1 is an exploded perspective view of a rotation angle detector according to a first embodiment of the present invention.

FIG. 1 is an exploded perspective view of a rotation angle detector according to a first embodiment of the present invention. The rotation angle detector includes rotator 11; first detecting body 32; second detecting body 33; auxiliary detecting body 10; magnets 35A, 36A, and 15A; magnetic detection elements 35B, 36B, and 15B; and controller 17.

Rotator 11 is made of an insulating resin or a metal. Rotator 11 has spur gear 11A on the outer periphery of a side surface thereof. Rotator 11 is provided at its center with a hole for passing a shaft of a steering wheel (unillustrated) therethrough, and on its inner periphery with engaging portion 11B to be engaged with the shaft of the steering wheel.

First detecting body 32 has spur gear 32A on the outer periphery of the side surface thereof. Second detecting body 33 has spur gear 33A on the outer periphery of the side surface thereof. Spur gear 32A has a different number of teeth than spur gear 33A, and is engaged with both spur gears 11A and 33A. Therefore, first detecting body 32 rotates in association with rotator 11, and second detecting body 33 rotates in association with first detecting body 32 at a different speed therefrom. First detecting body 32 is provided at its center with magnet 35A mounted by insert molding or the like, and second detecting body 33 is provided at its center with magnet 36A mounted by insert molding or the like.

Auxiliary detecting body 10 has spur gear 10A on the outer periphery of the side surface thereof. Spur gear 10A is engaged with spur gear 11A of rotator 11 at a position symmetrical to first detecting body 32 with respect to a rotation axis of rotator 11. Auxiliary detecting body 10 is further provided with magnet 15A at its center.

Rotator 11 has the largest diameter and number of teeth. Second detecting body 33 and auxiliary detecting body 10 have the next largest diameter and number of teeth. First detecting body 32 has the smallest diameter and number of teeth. For example, rotator 11 may have 87 teeth, first detecting body 32 may have 29 teeth, and second detecting body 33 and auxiliary detecting body 10 may have 30 teeth, respectively.

Wiring board 14A is placed above first and second detecting bodies 32 and 33, nearly parallel thereto. Similarly, wiring board 14B is placed above auxiliary detecting body 10, nearly parallel thereto. Wiring boards 14A and 14B are each provided on both sides thereof with a plurality of wiring patterns (unillustrated). On wiring board 14A, magnetic detection elements 35B and 36B such as anisotropic magnetoresistive (AMR) elements are mounted at the positions facing magnets 35A and 36A, respectively. On wiring board 14B, magnetic detection element 15B is mounted at a position facing magnet 15A.

Magnet 35A and magnetic detection element 35B thus face each other, and together form a first detector which detects rotation of first detecting body 32. Similarly, magnet 36A and magnetic detection element 36B together form a second detector which detects rotation of second detecting body 33. Magnet 15A and magnetic detection element 15B together form an auxiliary detector which detects rotation of auxiliary detecting body 10.

Controller 17 is formed of an electronic component such as a microcomputer and mounted on wiring board 14A. Controller 17 is connected to magnetic detection elements 35B, 36B, and 15B via wiring patterns or wiring sheet 16.

Case 18 is box-shaped and made of an insulating resin. Rotator 11 has cylindrical portion 11C on its bottom surface, and case 18 has cylindrical portion 18A whose inner periphery rotatably holds cylindrical portion 11C. Case 18 further has shafts 18B, 18C and 18D. Shaft 18B rotatably holds the center of first detecting body 32, shaft 18C rotatably holds the center of second detecting body 33, and shaft 18D rotatably holds the center of auxiliary detecting body 10. As described above, case 18 rotatably supports rotator 11, first detecting body 32, second detecting body 33, and auxiliary detecting body 10.

In the rotation angle detector thus structured, controller 17 is connected to an electronic circuit (unillustrated) in an automobile via, for example, a connector or a lead wire (unillustrated). The shaft of the steering wheel passing through the hole at the center of rotator 11 is engaged with engaging portion 11B, so that the rotation angle detector is attached to the automobile.

In the above-described structure, when the steering wheel rotates, rotator 11 starts to rotate and causes first detecting body 32 and auxiliary detecting body 10 to rotate in association therewith. The rotation of first detecting body 32 causes second detecting body 33 to rotate in association therewith. Accordingly, magnets 35A, 36A, and 15A attached at their centers also start to rotate. Magnetic detection elements 35B, 36B, and 15B detect changes in magnetism of magnets 35A, 36A, and 15A, respectively, and output them as detection signals.

Since spur gears 32A and 33A have different numbers of teeth than each other and, therefore, first and second detecting bodies 32 and 33 rotate at different speeds than each other. As a result, data waveforms from magnetic detection elements 35B and 36B have different cycle lengths from each other and, therefore, become detection signals different in phase.

Controller 17 performs a predetermined calculation based on the two different detection signals obtained from magnetic detection elements 35B and 36B and on the numbers of teeth of spur gears 32A and 33A, thereby detecting a rotation angle of rotator 11. This rotation angle corresponds to a rotation angle of the steering wheel. The result is output to the electronic circuit of the automobile so as to perform various functions for the automobile. A method performed by controller 17 for calculating a rotation angle using two detection signals different in phase is disclosed in U.S. Pat. No. 6,870,470, for example.

Figure 2A:
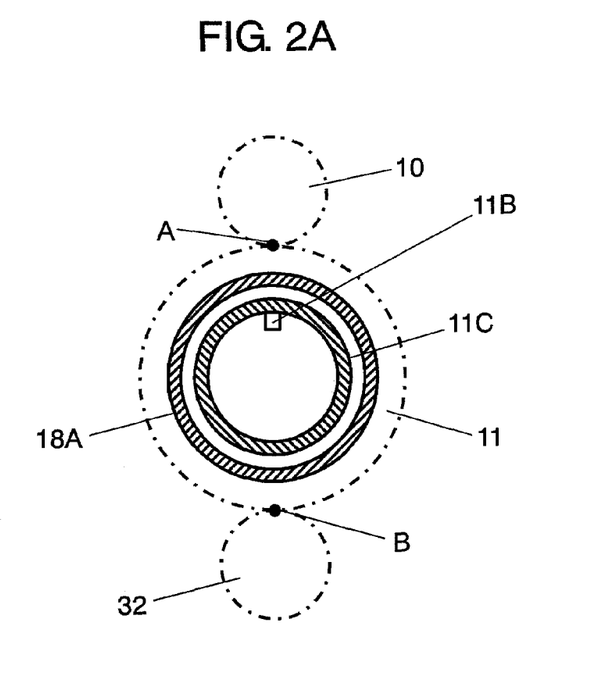
FIGS. 2A and 2B show schematic plan views of the rotation angle detector shown in FIG. 1.

As shown in the schematic plan view of FIG. 2A, there is a gap providing a certain clearance between the outer periphery of cylindrical portion 11C of rotator 11 and the inner periphery of cylindrical portion 18A of case 18 so that rotator 11 can rotate. The gap is only 0.1 mm or less.

Figure 2B:
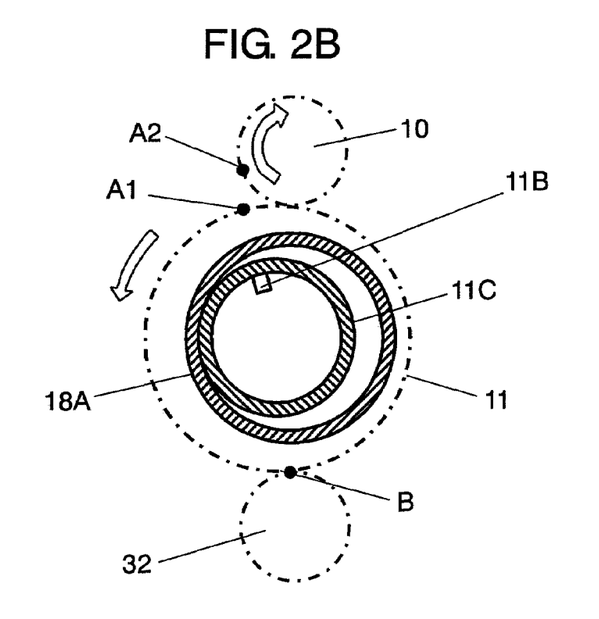

For example, when the steering wheel starts to rotate leftward (i.e., counter-clockwise), rotator 11 starts to rotate via the shaft of the steering wheel and engaging portion 11B engaged therewith, thereby moving leftward an amount corresponding to the gap, as shown in FIG. 2B. Consequently, the rotation of rotator 11 is transmitted to first detecting body 32 after the left-side of the outer periphery of cylindrical portion 11C comes into contact with the left-side of the inner periphery of cylindrical portion 18A.

More specifically, as soon as the steering wheel starts to rotate, first detecting body 32 starts to rotate slightly after rotator 11 starts to rotate. More specifically, after rotator 11 starts to rotate, first detecting body 32 starts to rotate with a time delay corresponding to the gap between cylindrical portion 11C and cylindrical portion 18A. Auxiliary detecting body 10, which is engaged with rotator 11 at a position symmetrical to first detecting body 32, starts to rotate simultaneously and in association with rotator 11.

In other words, immediately after the steering wheel starts to rotate, rotator 11 rotates an amount corresponding to the angle from point A to point A1. However, point B, at which rotator 11 is engaged with first detecting body 32, does not change. First detecting body 32 starts to rotate after a time delay corresponding to the angle from point A to point A1. Auxiliary detecting body 10, on the other hand, rotates an amount corresponding to the angle from point A to point A2 in association with rotator 11.

Therefore, during the time until first detecting body 32 starts to rotate after rotator 11 starts to rotate in association with the steering wheel, controller 17 receives a detection signal only from magnetic detection element 15B facing auxiliary detecting body 10. A little later, controller 17 receives detection signals from magnetic detection elements 35B and 36B.

Auxiliary detecting body 10 and second detecting body 33 have the same number of teeth, so that the data waveforms of the detection signals from magnetic detection elements 15B and 36B are the same in cycle length. On the other hand, first detecting body 32 has a different number of teeth and rotational speed than these detecting bodies. Therefore, the detection signal from magnetic detection element 35B is different in cycle length and, hence, in phase from the detection signals obtained from these elements. As described above, while receiving the detection signal only from magnetic detection element 15B, controller 17 detects a rotation angle of rotator 11 by the detection signal from magnetic detection element 15B.

After this, first and second detecting bodies 32 and 33 start to rotate. When receiving the detection signals from magnetic detection elements 35B and 36B, controller 17 performs a predetermined calculation based on these three detection signals and on the numbers of teeth, thereby detecting a rotation angle of rotator 11. The rotation angle of rotator 11 corresponds to the rotation angle of the steering wheel.

Meanwhile, it is preferable for controller 17 to compare the detection signals from magnetic detection element 35B and from magnetic detection element 15B. It is also preferable for controller 17 to determine that the detection signal corresponding to the larger rotation angle indicates the rotation angle with no delay immediately after the steering wheel starts to rotate. Controller 17 detects a rotation angle based on the above-mentioned detection signal and on the detection signal from magnetic detection element 36B of the second detector. Controller 17 then outputs the detected rotation angle to the electronic circuit of the automobile so as to perform various functions for the automobile.

As described above, according to the present embodiment, auxiliary detecting body 10 is engaged with rotator 11 at a position symmetrical to first detecting body 32 with respect to the rotation axis of rotator 11. Then, controller 17 detects the detection signal received from magnetic detection element 15B which is a component of the auxiliary detector. Controller 17 can accurately detect a rotation angle with a simple structure during the time between when first detecting body 32 starts to rotate and when rotator 11 starts to rotate in association with the steering wheel. Thus, controller 17 detects a rotation angle of rotator 11 based on the detection signals from the first, second, and auxiliary detectors.

It is preferable for controller 17 to compare the detection signal from magnetic detection element 35B which is a component of the first detector and that from magnetic detection element 15B which is a component of auxiliary detector. When one of first detecting body 32 and auxiliary detecting body 10 is rotating and the other is not, controller 17 detects a rotation angle using the detection signal of the rotating detecting body. In other words, when only one of the first detector and the auxiliary detector output a detection signal, controller 17 detects a rotation angle of rotator 11 based on the output detection signal. When both detecting bodies are rotating, controller 17 detects a rotation angle using the detection signal corresponding to the larger rotation angle. As a result, controller 17 can accurately detect a rotation angle.

Further, there are cases where there is a difference in terms of the rotation angle which is equal to or greater than a predetermined value between the detection signal from magnetic detection element 35B and that from magnetic detection element 15B. When the detection signals have a difference therebetween of, for example, 3 degrees in terms of the rotation angle of rotator 11, controller 17 determines that an abnormality or breakage has occurred in one of the detecting bodies or at least one of the detectors. Controller 17 then transmits the information to the electronic circuit of the automobile. As a result, the electronic circuit of the automobile receives an accurate rotation angle.

As described above, second detecting body 33 and auxiliary detecting body 10 have the same number of teeth and rotate at the same speed as each other. Alternatively, the present invention can be implemented by rotating them at different speeds than each other; however, the process in controller 17 can be simplified by rotating them at the same speed.

Figure 3:
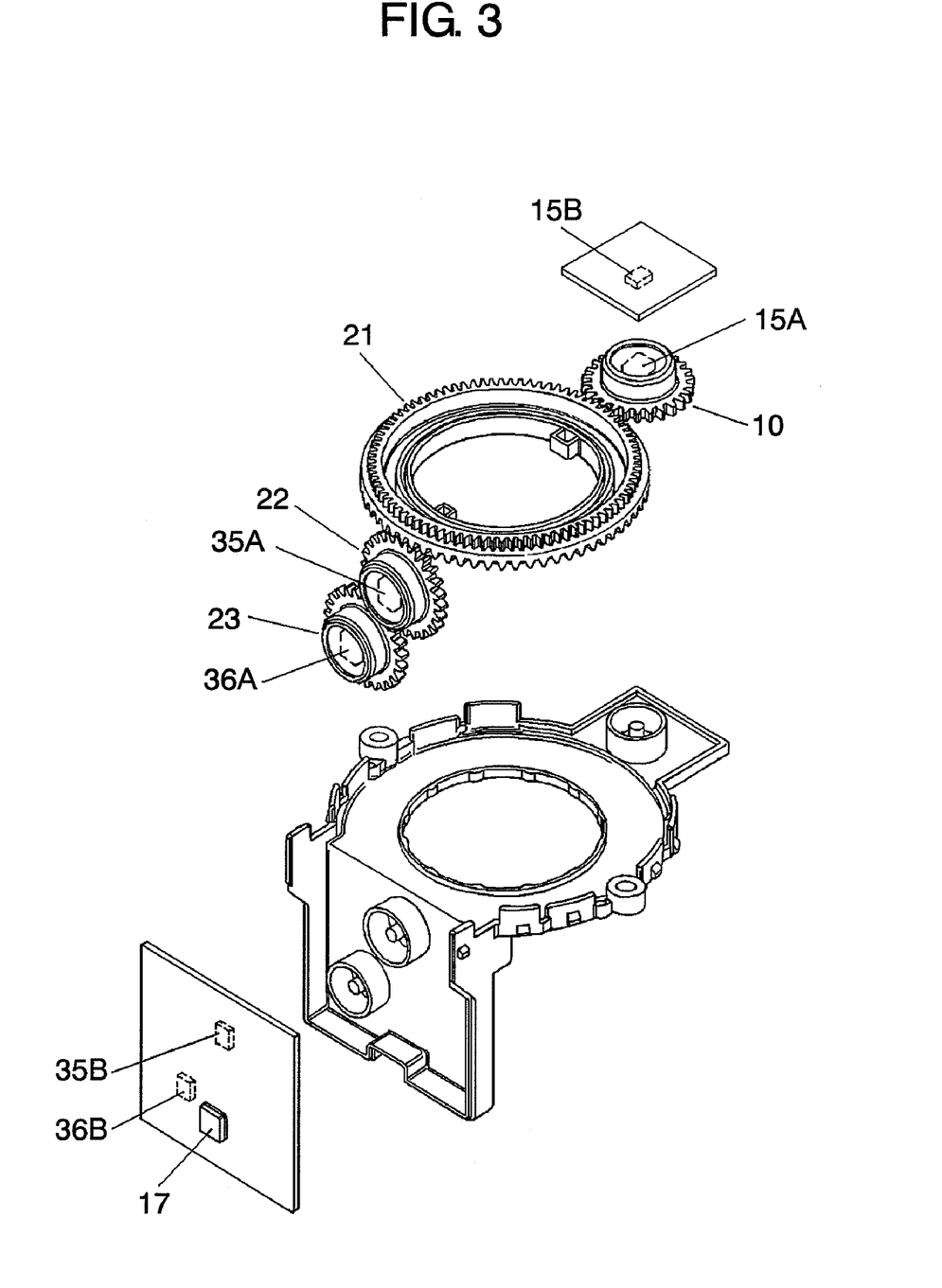
FIG. 3 is an exploded perspective view of a rotation angle detector according to a second embodiment of the present invention.
Figure 4:
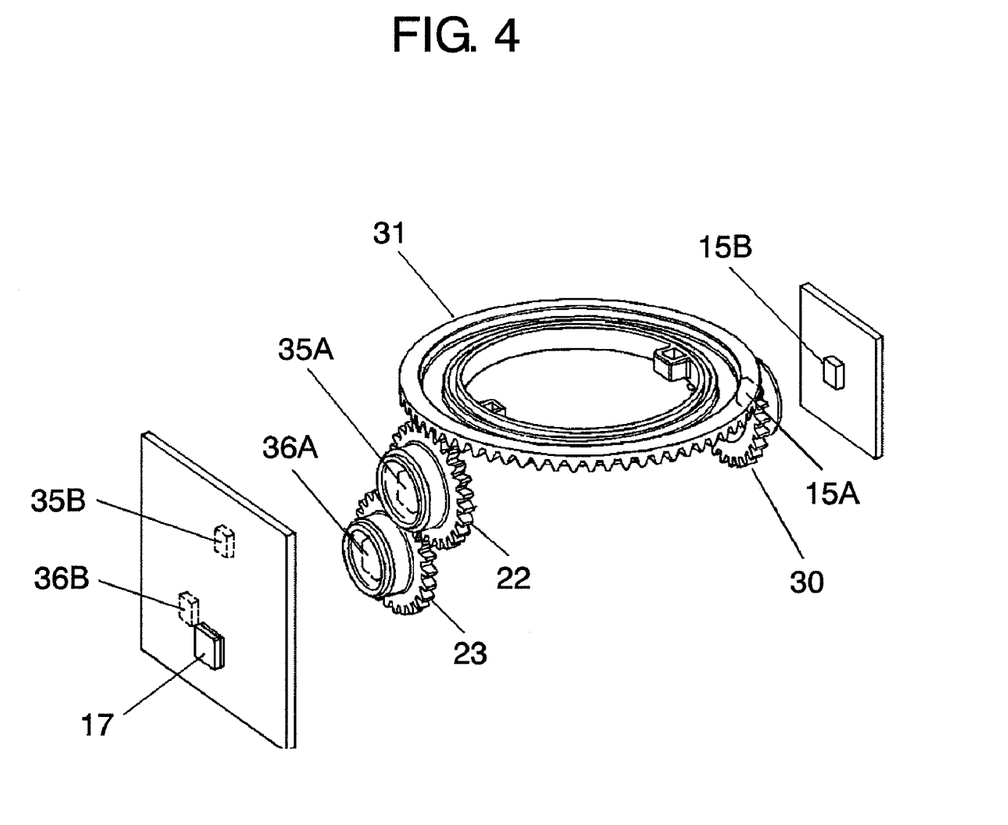
FIG. 4 is an exploded perspective view of a rotation angle detector according to a third embodiment of the present invention.

In the aforementioned embodiment, first, second, and auxiliary detecting bodies 32, 33, and 10 are horizontally aligned with rotator 11 so that their gears are engaged with each other on the outer peripheries of the side surfaces thereof. In other words, the rotation axes of rotator 11 and first, second, and auxiliary detecting bodies 32, 33, and 10 are parallel to each other. However, the present invention is not limited to this structure. Other embodiments are described with reference to FIGS. 3 and 4 as follows. FIGS. 3 and 4 are exploded perspective views of other rotation angle detectors according to the present invention.

The present invention can also be implemented by the embodiment illustrated in FIG. 3. In this embodiment, rotator 21 has gears both on the outer periphery of the side surface thereof and on the outer periphery of the bottom surface thereof. The gear on the outer periphery of the bottom surface of rotator 21 is engaged with first detecting body 22. First detecting body 22 is engaged with second detecting body 23. Auxiliary detecting body 10 is engaged with the gear on the outer periphery of the side surface of rotator 21 at a position symmetrical to first detecting body 22 with respect to the rotation axis of rotator 21. In other words, the rotation axes of rotator 21 and auxiliary detecting body 10 are parallel to each other, and the rotation axes of first and second detecting bodies 22 and 23 are parallel to each other and substantially perpendicular to the rotation axis of rotator 21 in this embodiment.

The present invention can also be implemented by the embodiment illustrated in FIG. 4. In this embodiment, rotator 31 has a gear on the outer periphery of the bottom surface thereof. The gear is engaged with first detecting body 22. The first detecting body 22 is engaged with second detecting body 23. Auxiliary detecting body 30 is engaged with the gear on the outer periphery of the bottom surface of rotator 31 at a position symmetrical to first detecting body 22 with respect to the rotation axis of rotator 31. In other words, the rotation axes of first, second, and auxiliary detecting bodies 22, 23, and 30 are parallel to each other and substantially perpendicular to the rotation axis of rotator 31 in this embodiment.

Further, using a rotator having a bevel gear can form an angle other than 0 degrees between the rotation axis of the rotator and the rotation axes of the first, second, and auxiliary detecting bodies. Thus, at least one of the rotation axes of the first, second, and auxiliary detecting bodies can form an angle of other than 0 degrees with the rotation axis of the rotator.

Although the gears of rotator 11, 21, or 31 and the gears of the detecting bodies are engaged with each other and rotate in association with each other, the present invention is not limited to those structures. The present invention can be implemented by providing the rotator and the detecting bodies with uneven portions, high friction portions, or the like that can transmit rotation on their outer peripheries instead of the gears, and by rotating them in association with each other.

Thus, the rotation angle detector of the present invention can accurately detect a rotation angle with a simple structure and, therefore, is useful mainly for detecting a rotation angle of a steering wheel of an automobile.

The invention claimed is:

1. A rotation angle detector comprising:
a rotator;
a first detecting body configured to rotate in association with the rotator;
a first detector configured to detect rotation of the first detecting body;
a second detecting body configured to rotate at a different speed from the first detecting body in association with the first detecting body;
a second detector configured to detect rotation of the second detecting body;
an auxiliary detecting body engaged with the rotator at a position symmetrical to the first detecting body with respect to a rotation axis of the rotator;
an auxiliary detector configured to detect rotation of the auxiliary detecting body; and
a controller configured to detect a rotation angle of the rotator based on detection signals from the first detector, from the second detector, and from the auxiliary detector,
wherein the controller is configured to compare the detection signals from the auxiliary detector and from the first detector.

2. The rotation angle detector according to claim 1, wherein when only one of the first detector and the auxiliary detector outputs a detection signal, the controller is configured to detect the rotation angle of the rotator based on the detection signal output from the one of the first detector and the auxiliary detector.

3. The rotation angle detector according to claim 1, wherein the second detecting body and the auxiliary detecting body are configured to rotate at a same speed.

4. The rotation angle detector according to claim 1, wherein the controller is configured to detect the rotation angle by using a larger one of the detection signals from the auxiliary detector and from the first detector.

5. The rotation angle detector according to claim 1, wherein when there is a difference not less than a predetermined value between the detection signals from the auxiliary detector and from the first detector, the controller determines that an abnormality has occurred in at least one of the first detecting body, the auxiliary detecting body, the first detector, and the auxiliary detector.

6. The rotation angle detector according to claim 1, wherein the first detecting body, the second detecting body, and the auxiliary detecting body each have a rotation axis; and the rotation axis of the rotator, and rotation axes of the first detecting body, the second detecting body, and the auxiliary detecting body are parallel to each other.

7. A rotation angle detector comprising:
a rotator;
a first detecting body configured to rotate in association with the rotator;
a first detector configured to detect rotation of the first detecting body;
a second detecting body configured to rotate at a different speed from the first detecting body in association with the first detecting body;
a second detector configured to detect rotation of the second detecting body;
an auxiliary detecting body engaged with the rotator at a position symmetrical to the first detecting body with respect to a rotation axis of the rotator;
an auxiliary detector configured to detect rotation of the auxiliary detecting body; and
a controller configured to detect a rotation angle of the rotator based on detection signals from the first detector, from the second detector, and from the auxiliary detector,
wherein at least one of the first detecting body, the second detecting body, and the auxiliary detecting body has a rotation axis which forms an angle of other than 0 degrees with the rotation axis of the rotator.

8. The rotation angle detector according to claim 7, wherein at least one of the first detecting body, the second detecting body, and the auxiliary detecting body has a rotation axis which is perpendicular to the rotation axis of the rotator.

9. A rotation angle detector comprising:
a rotator rotatable about a rotation axis;
a first detecting body engaged with said rotator for rotation with said rotator;
a first detector configured to detect rotation of said first detecting body;
a second detecting body engaged with said first detecting body for rotation with said first detecting body, such that said second detecting body is separated from said rotator and arranged to be rotated with rotation of said rotator via said first detecting body, said second detecting body being configured to rotate at a different speed than said first detecting body;
a second detector configured to detect rotation of said second detecting body;
an auxiliary detecting body engaged with said rotator for rotating with said rotator;
an auxiliary detector configured to detect rotation of said auxiliary detecting body; and a controller configured to detect a rotation angle of said rotator based on a detection signal from at least one of said first detector, said second detector, and said auxiliary detector, wherein said first detecting body and said auxiliary detecting body are engaged with said rotator at positions which are symmetrical about the rotation axis of said rotator.

10. A rotation angle detector according to claim 9, said controller is configured to detect the rotation angle of said rotator based on a detection signal output from one of said first detector and said auxiliary detector.

11. The rotation angle detector according to claim 9, wherein said second detecting body and said auxiliary detecting body are configured to rotate at a same speed.

12. The rotation angle detector according to claim 9, wherein said controller is configured to compare a detection signal from said auxiliary detector to a detection signal from said first detector.

13. The rotation angle detector according to claim 12, wherein said controller is configured to detect the rotation angle using a larger one of the detection signal from said auxiliary detector and the detection signal from said first detector.

14. The rotation angle detector according to claim 12, wherein said controller is configured to determine an abnormality in at least one of said first detecting body, said auxiliary detecting body, and said first detector, and said auxiliary detector when there is a difference not less than a predetermined value between the detection signal from said auxiliary detector and the detection signal from said first detector.

15. The rotation angle detector according to claim 9, wherein said first detecting body, said second detecting body, and said auxiliary detecting body each have a rotation axis; and the rotation axis of said rotator, and the rotation axes of said first detecting body, said second detecting body, and said auxiliary detecting body are parallel to each other.

16. The rotation angle detector according to claim 9, wherein at least one of said first detecting body, said second detecting body, and said auxiliary detecting body has a rotation axis which forms an angle greater than 0 degrees with the rotation axis of said rotator.

17. The rotation angle detector according to claim 9, wherein at least one of said first detecting body, said second detecting body, and said auxiliary detecting body has a rotation axis which is perpendicular to the rotation axis of said rotator.

* * * * *